350-342 SR 114 R
XR T 940,016
SEARCH ROOM
Nov. 4, 1975
SUBSTITUTE FOR MISSING XR
K. F. NELSON
IMAGING DEVICE
Original Filed Jan. 13, 1975
T940,016
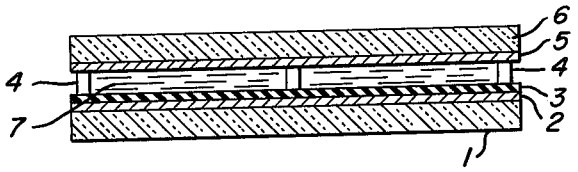

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 9

T940,016
IMAGING DEVICE
Kyler F. Nelson, Pittsford, N.Y., assignor to Xerox Corporation, Stamford, Conn.
Filed Jan. 13, 1975, Ser. No. 540,618
Int. Cl. G03g 5/34
U.S. Cl. 96—1.5
1 Sheet Drawing. 6 Pages Specification

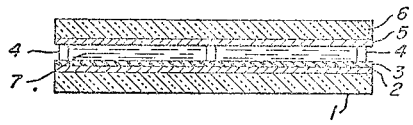

An imaging cell is provided with uniform spacing between substrates by vacuum evaporation of photoconductive or metallic material upon one cell substrate to form spacers during fabrication of the cell. In a preferred embodiment, an electrooptic cell comprises a bottom electrode (conductive, semi-transparent coating 2 on substrate 1), an overcoating of photoconductive arsenic triselenide 3; four or more arsenic triselenide posts 4 vacuum evaporated upon the arsenic triselenide photoconductive layer 3 and uniformly spaced along the edge of the photoconductive layer 3; and, a layer 7 of liquid crystalline material residing on the photoconductive layer 3 and a top electrode (conductive, semi-transparent coating 5 on substrate 6) in contact with the layer 7 of liquid crystalline material and residing on the arsenic triselenide spacers 4. The improved uniformity of spacing can be applied to any device, with or without a photoconductive layer, in which uniformity of imaging layer thickness is desired.